(12) United States Patent
Boutros et al.

(10) Patent No.: US 9,049,133 B2
(45) Date of Patent: Jun. 2, 2015

(54) VIRTUAL PRIVATE WIRE SERVICES USING E-VPN

(71) Applicant: Cisco Technology, Inc., San Jose, CA (US)

(72) Inventors: Sami Boutros, San Ramon, CA (US); Ali Sajassi, San Ramon, CA (US); Samer Salam, Vancouver (CA)

(73) Assignee: Cisco Technology, Inc., San Jose, CA (US)

( * ) Notice: Subject to any disclaimer, the term of this patent is extended or adjusted under 35 U.S.C. 154(b) by 167 days.

(21) Appl. No.: 13/927,350

(22) Filed: Jun. 26, 2013

(65) Prior Publication Data

US 2015/0006757 A1    Jan. 1, 2015

(51) Int. Cl.
*G06F 15/173*    (2006.01)
*H04L 12/721*    (2013.01)

(52) U.S. Cl.
CPC ..................................... *H04L 45/14* (2013.01)

(58) Field of Classification Search
CPC ....................................................... H40L 45/14
USPC .......................................................... 709/242
See application file for complete search history.

(56) References Cited

U.S. PATENT DOCUMENTS

| 7,643,409 | B2 | 1/2010 | Voit et al. | |
|---|---|---|---|---|
| 2005/0190757 | A1 | 9/2005 | Sajassi | |
| 2010/0040368 | A1* | 2/2010 | Kotrla et al. | 398/54 |
| 2011/0116443 | A1* | 5/2011 | Yu et al. | 370/328 |
| 2012/0201124 | A1 | 8/2012 | Marques et al. | |
| 2012/0213222 | A1 | 8/2012 | Filsfils et al. | |
| 2013/0148657 | A1 | 6/2013 | Salam et al. | |

OTHER PUBLICATIONS

RFC 4448 (Martini, Apr. 2006).*
RFC 4364 (Rosen, Feb. 2006).*
BGP MPLS Based Ethernet VPN (draft-ietf-l2vpn-evpn-00) (Aggarwal, Feb. 24, 2012).*
Martini, et al., "Encapsulation Methods for Transport of Ethernet over MPLS Networks", Network Working Group, Request for Comments 4448, Apr. 2006, 24 pages, Internet Engineering Task Force.
Martini, et al., "Dynamic Placement of Multi Segment Pseudowires", Network Working Group, Internet Draft, draft-ietf-pwe3-dynamic-ms-pw-16, Dec. 2012, 22 pages, Internet Engineering Task Force.
Sajassi, et al., "BGP MPLS Based Ethernet VPN", Network Working Group, Internet Draft, draft-ietf-l2vpn-evpn-03, Feb. 2013, 47 pages, Internet Engineering Task Force.

* cited by examiner

*Primary Examiner* — Vivek Srivastava
*Assistant Examiner* — Nicholas Celani
(74) *Attorney, Agent, or Firm* — Parker Ibrahim & Berg LLC; James M. Behmke; Kenneth J. Heywood

(57) ABSTRACT

In one embodiment, one or more point-to-point (P2P) services are established between attachment circuits on provider edge (PE) devices in a computer network, and each of the one or more P2P services (e.g., Virtual Private Wire Service, VPWS) are associated with an Ethernet virtual private network (E-VPN) Ethernet Auto-Discovery (A-D) route, where links between the PE devices and customer edge (CE) devices are configured as Ethernet interfaces with Ethernet tagging. As such, the Ethernet A-D route may then be exchanged for each P2P service attachment circuit, and forwarding can be performed on the one or more P2P services without performing a media access control (MAC) address lookup and without performing MAC learning.

17 Claims, 10 Drawing Sheets

VIRTUAL PRIVATE WIRE SERVICES USING E-VPN

TECHNICAL FIELD

The present disclosure relates generally to computer networks, and, more particularly, to virtual private wire service (VPWS) using ethernet virtual private network (E-VPN) technology.

BACKGROUND

Virtual Private Wire Service (VPWS) is a VPN service that supplies Layer 2 point-to-point (P2P) connectivity between sites. The Internet Engineering Task Force (IETF) has presented a Request for Comment (RFC) 4448, entitled "Encapsulation Methods for Transport of Ethernet over MPLS Networks", which defines a solution to support VPWS for Ethernet connectivity using Ethernet over Multi-Protocol Label Switching (EoMPLS) pseudowires (PWs). This is a proven and widely deployed technology in service provider networks, however it suffers from a number of shortcomings:
- Label signaling is done via the Label Distribution Protocol (LDP) and service endpoint discovery is either through manual provisioning or through the Border Gateway Protocol (BGP). So, for auto-discovery, the network operator needs to run and maintain two sets of protocols.
- Redundancy is limited to active/standby mode, and the backup PWs are not used to carry any traffic. Hence, there is no load-balancing capability, unless a cluster/virtual-switch solution is used.
- Local repair mechanisms are not defined.
- Inter-Autonomous System (Inter-AS) redundancy is complex, and convergence requires exchange of two sets of messages to deactivate the group of primary PWs and activate the group of backup PWs.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
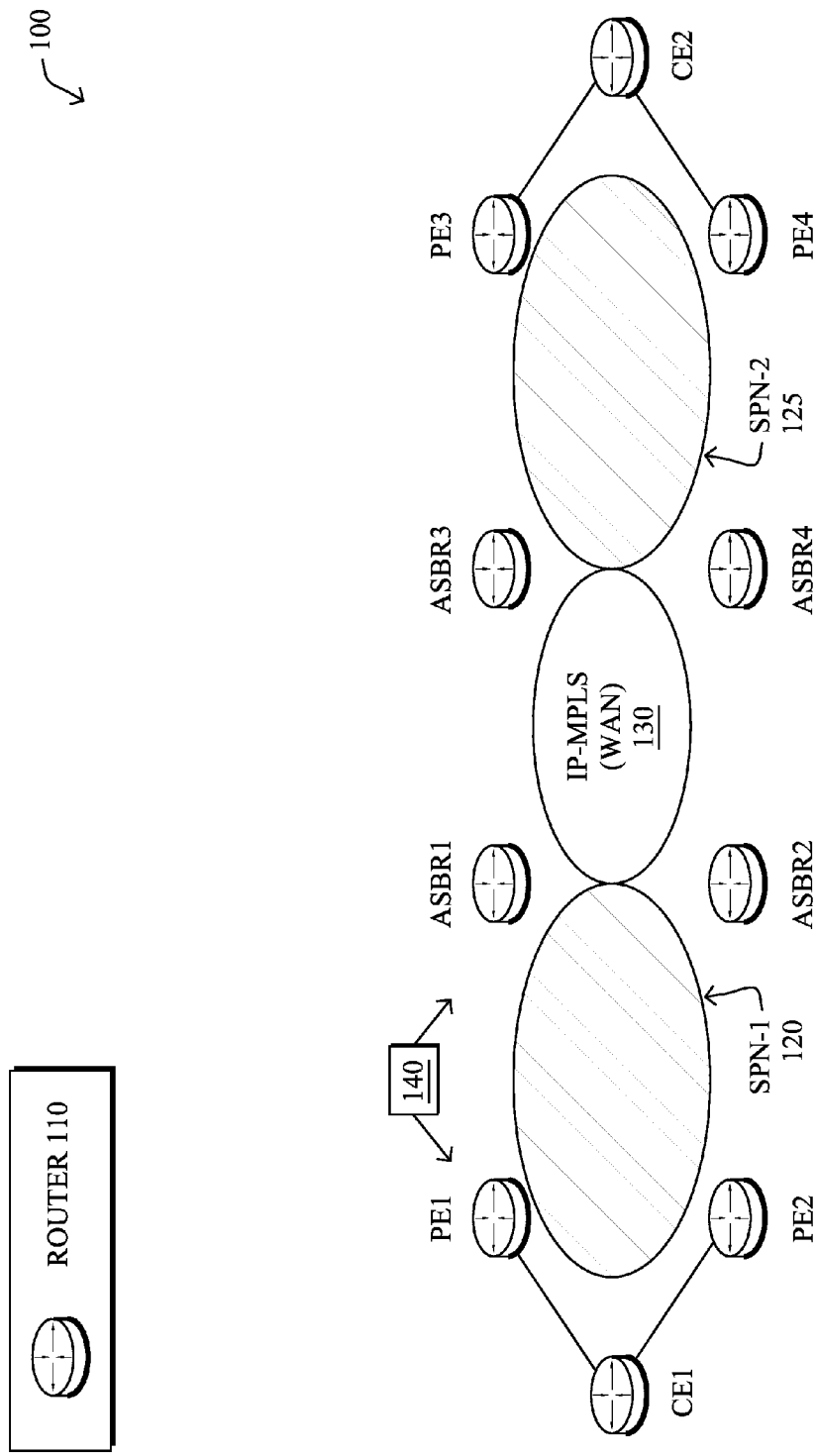
FIG. 1 illustrates an example computer network.

According to one or more embodiments of the disclosure, one or more point-to-point (P2P) services are established between provider edge (PE) devices in a computer network, and each of the one or more P2P services (e.g., Virtual Private Wire Service, VPWS) are associated with an Ethernet virtual private network (E-VPN) Ethernet Auto-Discovery (A-D) route, where links between the PE devices and customer edge (CE) devices are configured as Ethernet Segments with VLAN tagging. As such, the Ethernet A-D route may then be exchanged for each P2P service attachment circuit, and forwarding can be performed on the one or more P2P services without performing a media access control (MAC) address lookup and without performing MAC learning.

Description

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Since management of interconnected computer networks can prove burdensome, smaller groups of computer networks may be maintained as routing domains or autonomous systems. The networks within an autonomous system (AS) are typically coupled together by conventional "intradomain" routers configured to execute intradomain routing protocols, and are generally subject to a common authority. To improve routing scalability, a service provider (e.g., an ISP) may divide an AS into multiple "areas" or "levels." It may be desirable, however, to increase the number of nodes capable of exchanging data; in this case, interdomain routers executing interdomain routing protocols are used to interconnect nodes of the various ASes. Moreover, it may be desirable to interconnect various ASes that operate under different administrative domains. As used herein, an AS, area, or level is generally referred to as a "domain."

FIG. 1 is a schematic block diagram of an example computer network 100 illustratively comprising nodes/devices, such as a plurality of routers 110 interconnected by links 115 or networks, as shown. For example, customer edge (CE) devices (e.g., CE1 and CE2) may be connected to service provider networks (e.g., SPN-1 120 and SPN-2 125, respectively) via provider edge (PE) devices (e.g., CE1 via PE1 and PE2, and CE2 via PE3 and PE4). Service provider networks may generally communicate with each other over a WAN 130 (e.g., IP-MPLS) via one or more AS border routers (ASBRs) (e.g., ASBR1 and ASBR2 for SPN-1, and ASBR3 and ASBR4 for SPN-2). Those skilled in the art will understand that any number of nodes, devices, links, etc. may be used in the computer network, and that the view shown herein is for simplicity. Those skilled in the art will also understand that while the embodiments described herein is described generally, it may apply to any network configuration within an Autonomous System (AS) or area, or throughout multiple ASes or areas, etc.

Data packets 140 (e.g., traffic/messages) may be exchanged among the nodes/devices 110 of the computer network 100 over links 115 using predefined network communication protocols such as the Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, etc.

Figure 2:
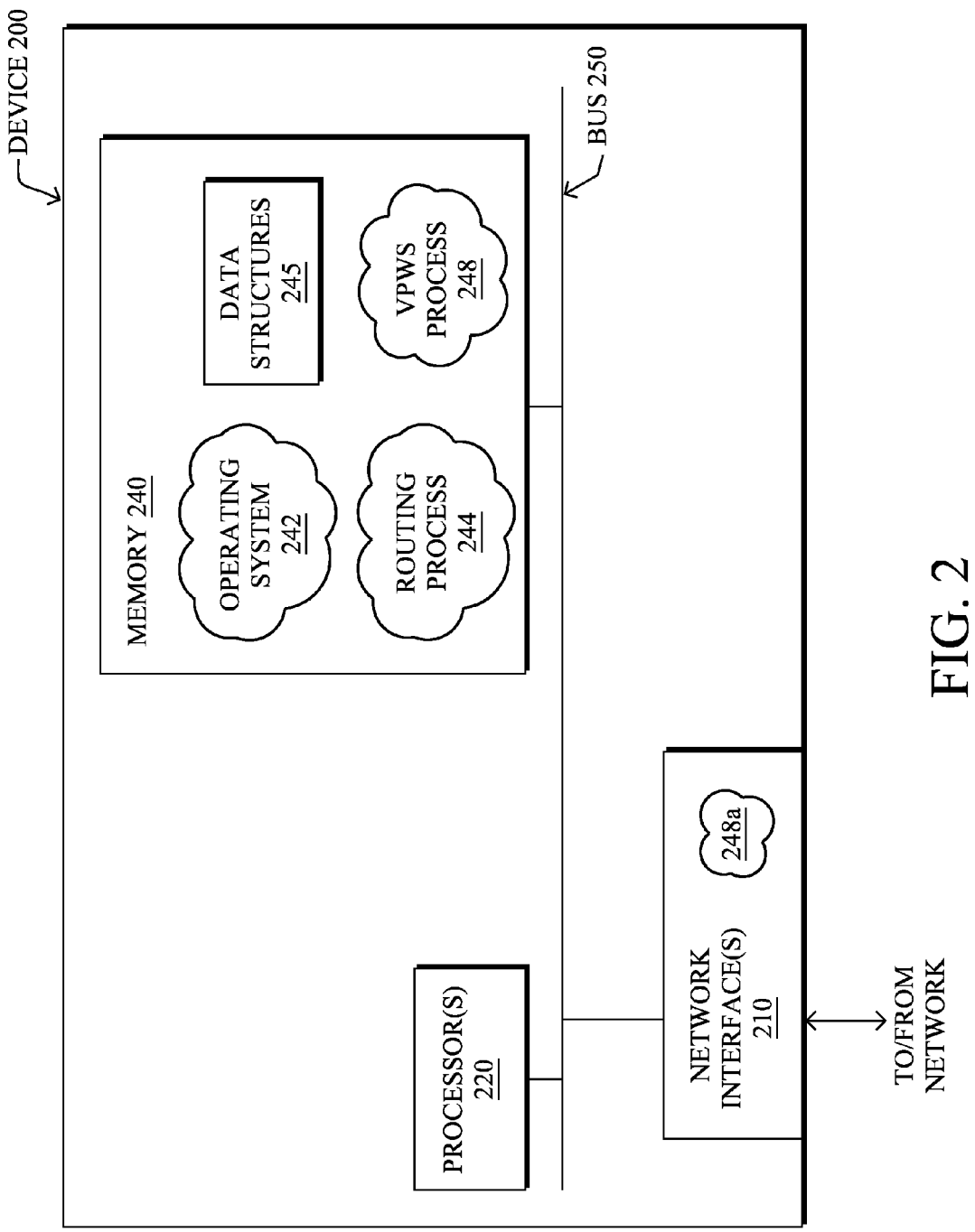
FIG. 2 illustrates an example network device/node.

FIG. 2 is a schematic block diagram of an example node/device 200 that may be used with one or more embodiments described herein, e.g., as any of the routers 110 (e.g., CEs, PEs, ASBRs, etc.) as shown in FIG. 1. The device comprises a plurality of network interfaces 210, one or more processors 220, and a memory 240 interconnected by a system bus 250. The network interfaces 210 contain the mechanical, electrical, and signaling circuitry for communicating data over physical links coupled to the network 100. The network interfaces may be configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc. Notably, a physical network interface 210 may also be used to implement one or more virtual network interfaces, such as for Virtual Private Network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc.), portions of which are typically resident in memory 240 and executed by the processor(s), functionally organizes the node by, inter alia, invoking network operations in support of software processes and/or services executing on the device. These software processes and/or services may comprise routing services 244 and an illustrative virtual private wire service (VPWS) process 248, as described herein, which may alternatively be located within individual network interfaces (e.g., process 248a).

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Routing process/services 244 contain computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database (not shown) containing, e.g., data used to make forwarding decisions. In particular, changes in the network topology may be communicated among routers 200 using routing protocols, such as the conventional OSPF and IS-IS link-state protocols (e.g., to "converge" to an identical view of the network topology). Notably, routing services 244 may also perform functions related to virtual routing protocols, such as maintaining VRF instances (not shown), or tunneling protocols, such as for Multi-Protocol Label Switching (MPLS), generalized MPLS (GMPLS), etc., each as will be understood by those skilled in the art.

As noted above, Virtual Private Wire Service (VPWS) is a VPN service that supplies Layer 2 point-to-point (P2P) connectivity between sites. The Internet Engineering Task Force (IETF) has presented a Request for Comment (RFC) 4448, entitled "Encapsulation Methods for Transport of Ethernet over MPLS Networks", which defines a solution to support VPWS for Ethernet connectivity using Ethernet over Multi-Protocol Label Switching (EoMPLS) pseudowires (PWs). This is a proven and widely deployed technology in service provider networks, however, as mentioned above, it suffers from a number of shortcomings:

Label signaling is done via the Label Distribution Protocol (LDP) and service endpoint discovery is either through manual provisioning or through the Border Gateway Protocol (BGP). So, for auto-discovery, the network operator needs to run and maintain two sets of protocols.

Redundancy is limited to active/standby mode, and the backup PWs are not used to carry any traffic. Hence, there is no load-balancing capability, unless a cluster/virtual-switch solution is used.

Local repair mechanisms are not defined.

Inter-Autonomous System (Inter-AS) redundancy is complex (e.g., such as that defined by the IETF Internet Draft entitled "Dynamic Placement of Multi Segment Pseudowires" <draft-ietf-pwe3-dynamic-ms-pw>), and convergence requires exchange of two sets of messages to deactivate the group of primary PWs and activate the group of backup PWs.

VPWS Using E-VPN

To address the noted shortcomings above, the techniques herein use ethernet virtual private network (E-VPN) technologies to support virtual private wire service (VPWS) in MPLS/IP networks, which allows for Active/Active Redundancy and integrated discovery capability using BGP. In particular, as described below, E-VPN enables the following characteristics for VPWS: 1) active/standby redundancy, 2) active/active multi-homing with flow-based load-balancing, 3) eliminates the need for single-segment and multi-segment PW signaling, and 4) provides faster convergence using data-plane prefix independent convergence upon node or link failure in comparison to control-plane convergence with PW redundancy.

E-VPN, e.g., as described in the IETF Internet Draft entitled "BGP MPLS Based Ethernet VPN" <draft-ietf-l2vpn-evpn>, has the ability to forward customer traffic to/from a given customer Attachment Circuit (AC) (aka an Ethernet Segment) without any MAC lookup. This capability is ideal in providing point-to-point (P2P) services (e.g., VPWS services). In general, Ethernet Virtual Private Line (EVPL) service may be defined as P2P service between a pair of ACs (designated by VLANs), and EVPL can be considered as a VPWS with only two ACs. In delivering an EVPL service, traffic forwarding capability of E-VPN between a pair of PEs that have advertised Ethernet Auto-Discovery (A-D) routes is used; whereas, for more general VPWS, traffic forwarding capability of E-VPN among a group of Ethernet Segments (one Ethernet A-D route per segment) is used. Since in VPWS services the traffic from an originating Ethernet Segment can go only to a single destination Ethernet Segment, no MAC lookup is needed and MPLS label associated with the destination Ethernet A-D route can be used in forwarding user traffic to the destination AC (segment).

In current PW redundancy mechanisms, convergence time is a function of control plane convergence characteristics. However, with E-VPN it is possible to attain faster convergence through the use of data-plane prefix independent convergence upon node or link failure. The techniques herein propose the use of the Ethernet A-D route to signal labels for P2P Ethernet services. As with E-VPN, the Ethernet Segment route can be used to synchronize the Link Aggregation Control Protocol (LACP) and other state between the PEs attached to the same multi-homed device.

Illustratively, the techniques described herein may be performed by hardware, software, and/or firmware, such as in accordance with the VPWS process 248/248a, which may contain computer executable instructions executed by the processor 220 (or independent processor of interfaces 210) to perform functions relating to the techniques described herein, e.g., in conjunction with routing process 244, and configured depending upon which device is performing the operation described herein (e.g., as a PE, ASBR, etc.). For example, the techniques herein may be treated as extensions to conventional protocols, such as the various VPWS protocols, and as such, may be processed by similar components understood in the art that execute those protocols, accordingly.

Figure 3:
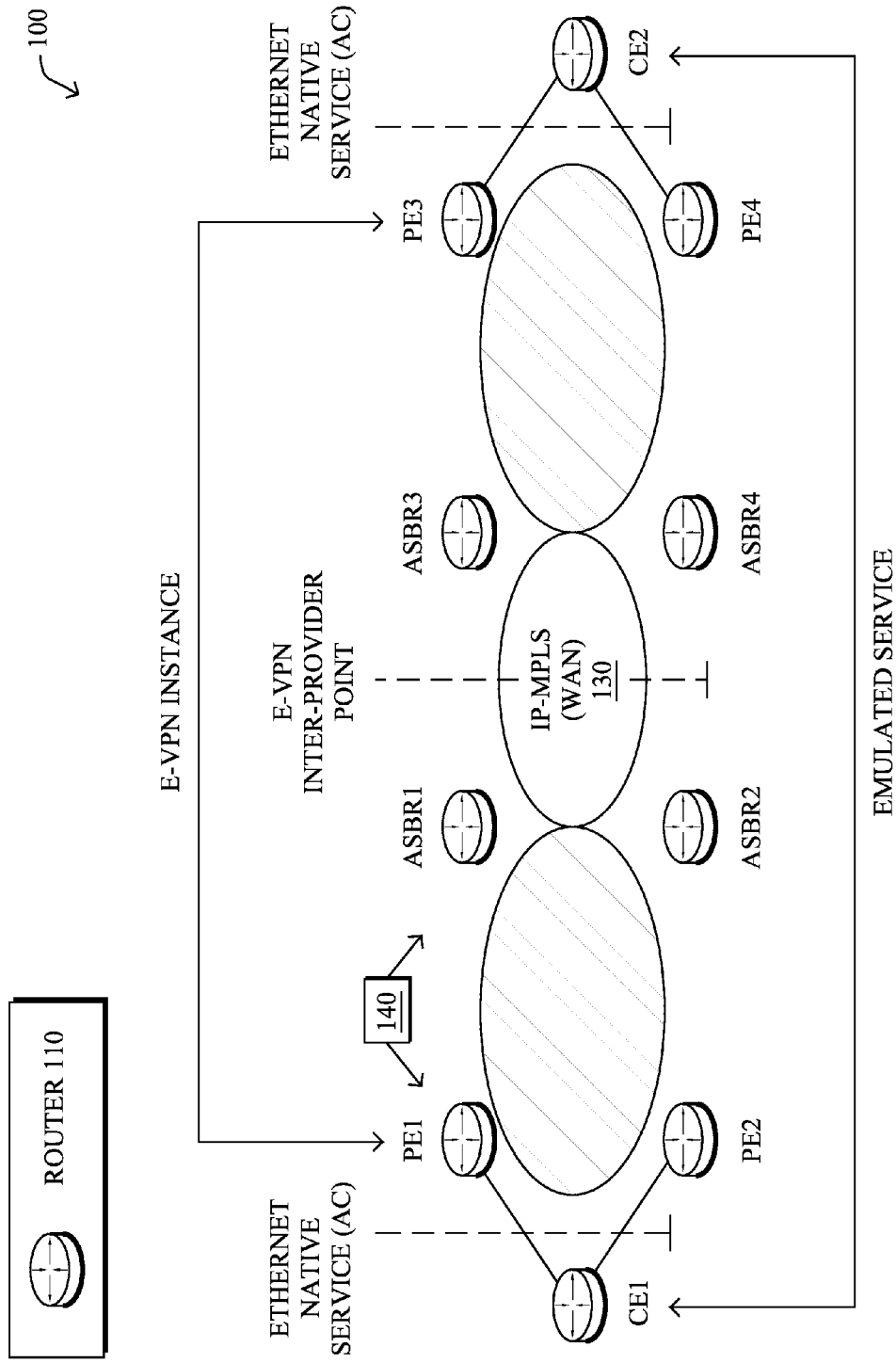
FIG. 3 illustrates another example view of the computer network with virtual private wire service (VPWS) using Ethernet Virtual Private Network (E-VPN) technology.

FIG. 3 illustrates an example of a P2P service (e.g., VPWS) deployed with E-VPN, as per one or more embodiments described in detail herein. Notably, interior (or internal) BGP (iBGP) sessions are established between PE1, PE2, ASBR1 and ASBR2, possibly via a BGP route-reflector. Similarly, iBGP sessions will be established between PE3, PE4, ASBR3 and ASBR4. Exterior (or external) BGP (eBGP) sessions are established among ASBR1, ASBR2, ASBR3, and ASBR4.

Figure 4:
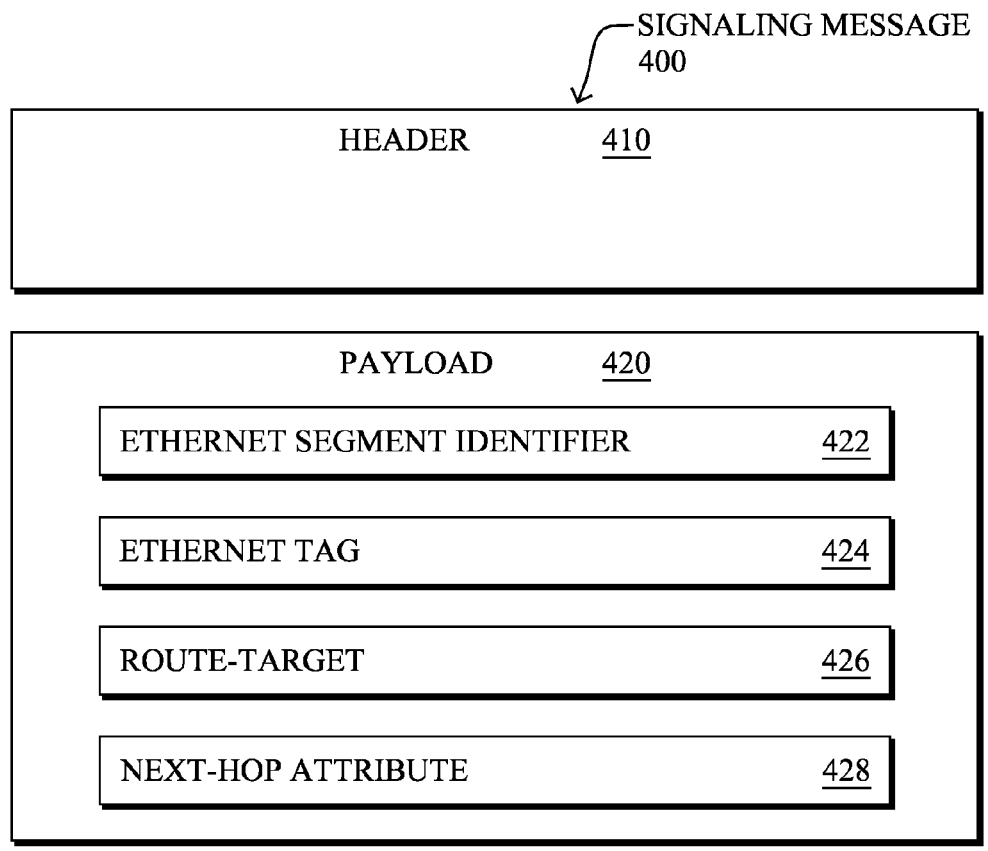
FIG. 4 illustrates an example signaling message for VPWS using E-VPN.

FIG. 4 illustrates an example signaling message 400 that may be used for VPWS using E-VPN (e.g., to signal P2P services) according to one or more embodiments herein, such as a modified Ethernet A-D route defined in <draft-ietf-l2vpn-evpn>, e.g., with a header 410 and payload 420 populated as described herein. In particular, an Ethernet Segment Identifier (ESI) field 422 may be set to the ESI of the attachment circuit (AC) of the VPWS service instance. The Ethernet Tag field 424 may be set to 0 in the case of an Ethernet Private Line (EPL) service, and to the VLAN identifier associated with the service for Ethernet Virtual Private Line (EVPL) service. The route is associated with a Route-Target (RT) extended community attribute 426 that identifies the service instance (together with the Ethernet Tag field when non-zero). Note that the PEs do not perform any media access control (MAC) learning or lookup for this service.

All PEs and ASBRs are enabled for the E-VPN subsequent address family identifier (SAFI), and exchange E-VPN Ethernet A-D routes—one route per AC. The ASBRs re-advertise the Ethernet A-D routes with the Next Hop attribute 428 set to their IP addresses. The link between the CE and the PE is an Ethernet interface (e.g., customer tag "C-TAG" or service tag "S-TAG" interface) as described in IEEE Standard 802.1Q that can carry a single VLAN tag or two VLAN tags nested in each other. Note that this interface may be configured as a trunk with multiple VLANs.

A VPWS with multiple sites or multiple EVPL services on the same CE port can be included in one E-VPN Instance (EVI) between two or more PEs. An Ethernet Tag corresponding to each P2P connection and known to both PEs is used to identify the services multiplexed in the same EVI. For CE multi-homing, the Ethernet A-D Route encodes the ESI associated with the CE. This allows flow-based load-balancing of traffic between PEs connected to the same multi-homed CE. In this instance, the BGP Route-Target (RT) must generally be the same on both PEs attached to the site. The Ethernet Segment route may be used too, for discovery of multi-homed CEs. In all cases traffic follows the transport paths, which may be asymmetric.

Notably, in comparison to PW Signaling, in E-VPN, service endpoint discovery and label signaling are done concurrently using BGP. Whereas, with VPWS based on RFC 4448, label signaling is done via LDP and service endpoint discovery is either through manual provisioning or through BGP. In VPWS, redundancy is limited to Active/Standby mode, while with E-VPN both Active/Active and Active/Standby redundancy modes can be supported. In VPWS, backup PWs are not used to carry traffic, while E-VPN traffic can be load-balanced among primary and secondary PEs. On link or node failure, E-VPN can trigger failover with the withdrawal of a single BGP route per service, whereas with VPWS PW redundancy, the failover sequence requires exchange of two control plane messages: one message to deactivate the group of primary PWs and a second message to activate the group of backup PWs associated with the access link. Finally, E-VPN may employ data plane local repair mechanisms not available in VPWS.

In general, and said differently, for P2P VPWS using E-VPN, an Ethernet A-D route is used per VPWS service instance with the route-target (RT) set to a common value among the PEs in the service instance, and iBGP sessions with E-VPN SAFI thus exchange the Ethernet A-D routes. The Ethernet segment route may also be used to exchange inter-chassis communication protocol (ICCP) information, autosensing of Ethernet Segment Identifier (ESI), etc. Typically, traffic will be asymmetric and will follow the transport. Also, according to the techniques herein, it is possible to include multiple VPWS service instances on the same main port in one E-VPN instance between two PEs, and in that situation a tag corresponding to each service instance and known to both PEs is set to identify the P2P service instance on the PE main port. For multi-homing, the Ethernet A-D Route will contain the ESI set, thus allowing equal cost multi-path (ECMP) techniques to PEs connected to a multi-homed site, where again, in this case the RT must be the same on both PEs attached to the site. In this manner, traffic from the remote PEs where the P2P service terminates can be load-balanced to both PEs attached to the multi-homed site, whereby an active/active (A/A) or else an active/standby (A/S) redundancy configuration may be established.

Figure 5A:
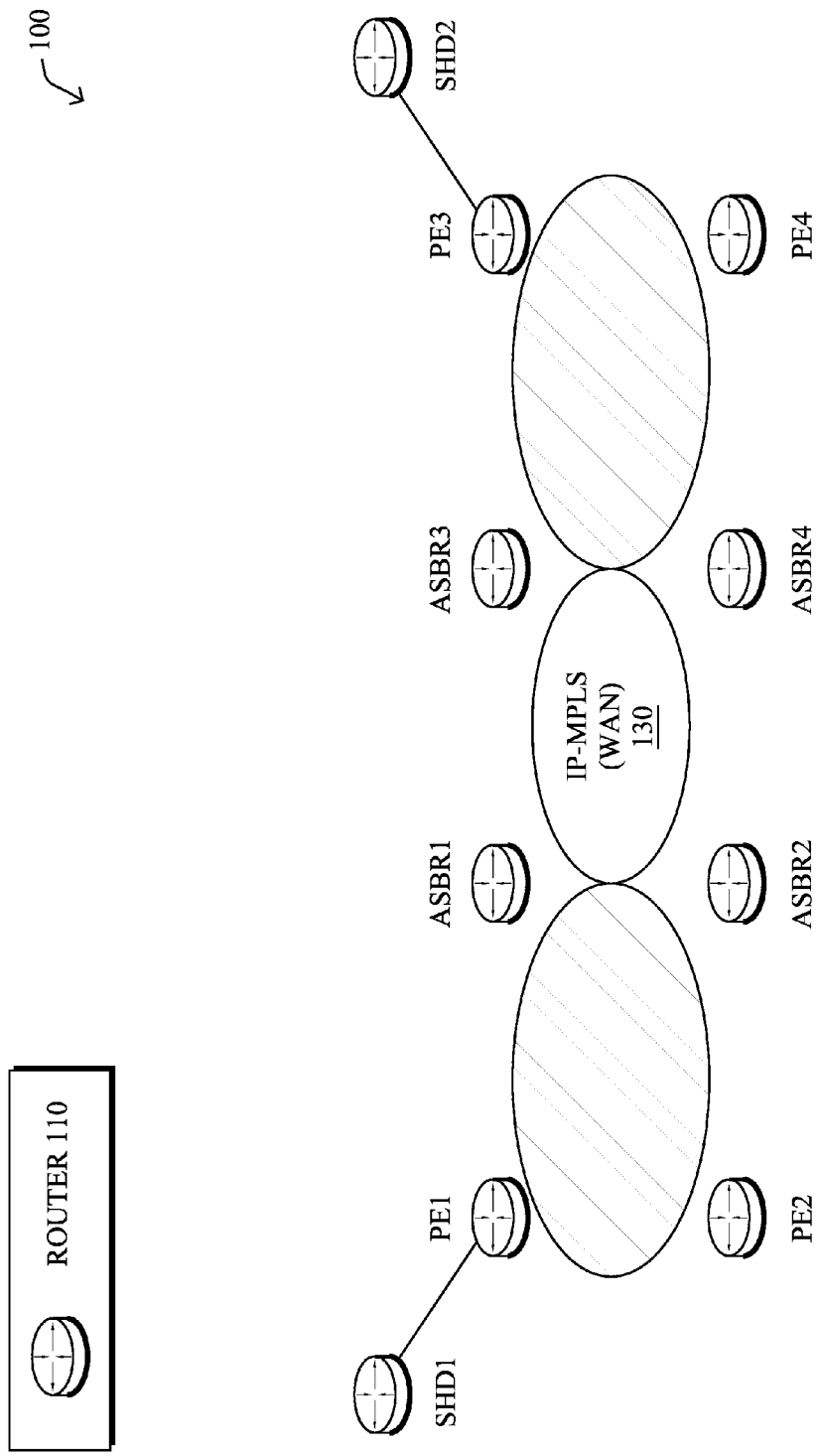
FIGS. 5A-5B illustrate examples of VPWS using E-VPN.

FIG. 5A illustrates an example of P2P VPWS using E-VPN in the single-homed (SH) scenario. In particular, one or multiple P2P VPWS may be set up between single-homed device 1 (SHD1) and SHD2 (e.g., CE devices). All P2P services on the SH port will share the same RT EVPN-ID-1, and PE1 and PE3 will advertise multiple A-D routes with different tags (one tag per P2P service), where all A-D routes will have the same RT E-VPN-ID1. ASBRs 1, 2, 3, and 4 will re-advertise the A-D routes with the next-hop as itself. For traffic on a given P2P service, PE1 and PE3 may be load-balanced to both ASBRs in their site.

Figure 5B:
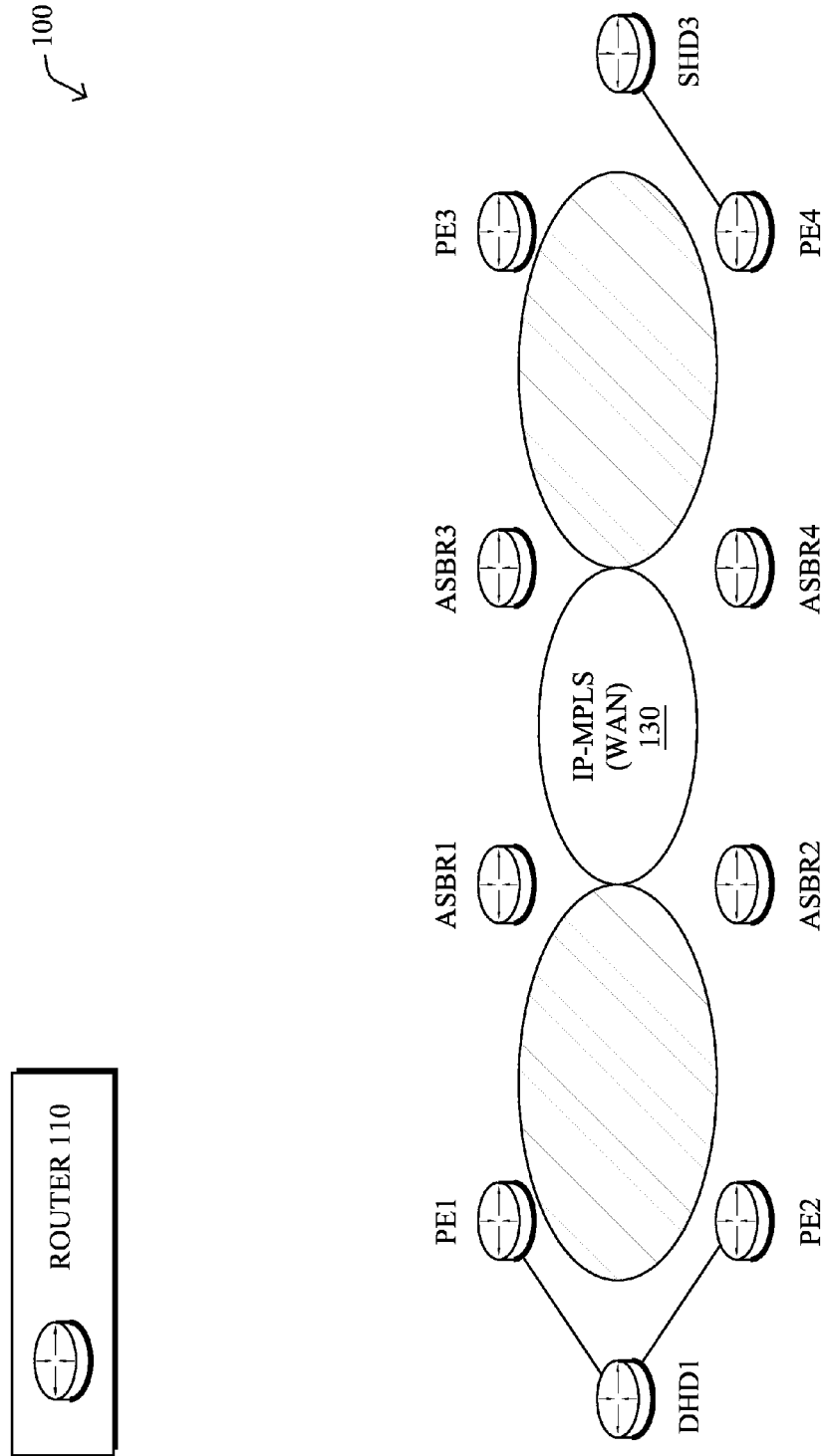

FIG. 5B, on the other hand, illustrates an example of P2P VPWS using E-VPN in a multi-homed (MH) scenario. In particular, here one or multiple P2P VPWS are set up between dual-homed device 1 (DHD1) (with A/A) and SHD3. All P2P services on DHD1 and SHD3 will share the same RT EVPN-ID-2, and PE1, PE2, and PE4 will advertise multiple A-D routes with different tags (one tag per P2P service instance) and all A-D routes will have the same RT E-VPN-ID2. Note that PE1 and PE2 will advertise the same ESI value in the Ethernet A-D route, and will exchange an Ethernet Segment route with ICCP information for multi-chassis link aggregation (MC-LAG), etc. Again, ASBRs 1, 2, 3, and 4 will re-advertise the A-D routes with next-hop as itself, and for traffic on a given P2P service, PE1, PE2, and PE4 will load-balance to both ASBRs in their site. Also, traffic from ASBRs will be load-balanced to both PE1 and PE2.

Figure 6A:
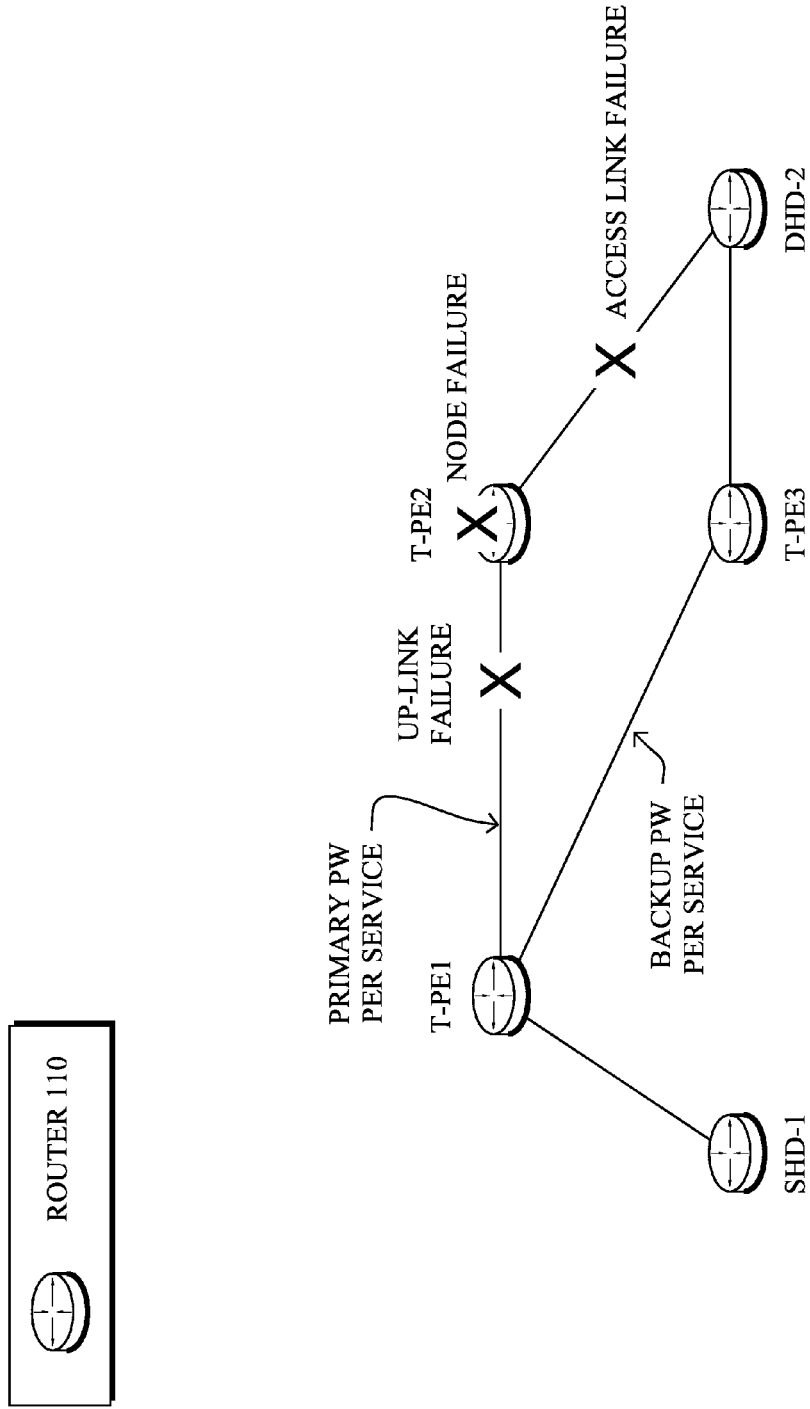
FIGS. 6A-6C illustrate further examples of VPWS using E-VPN.
Figure 6B:
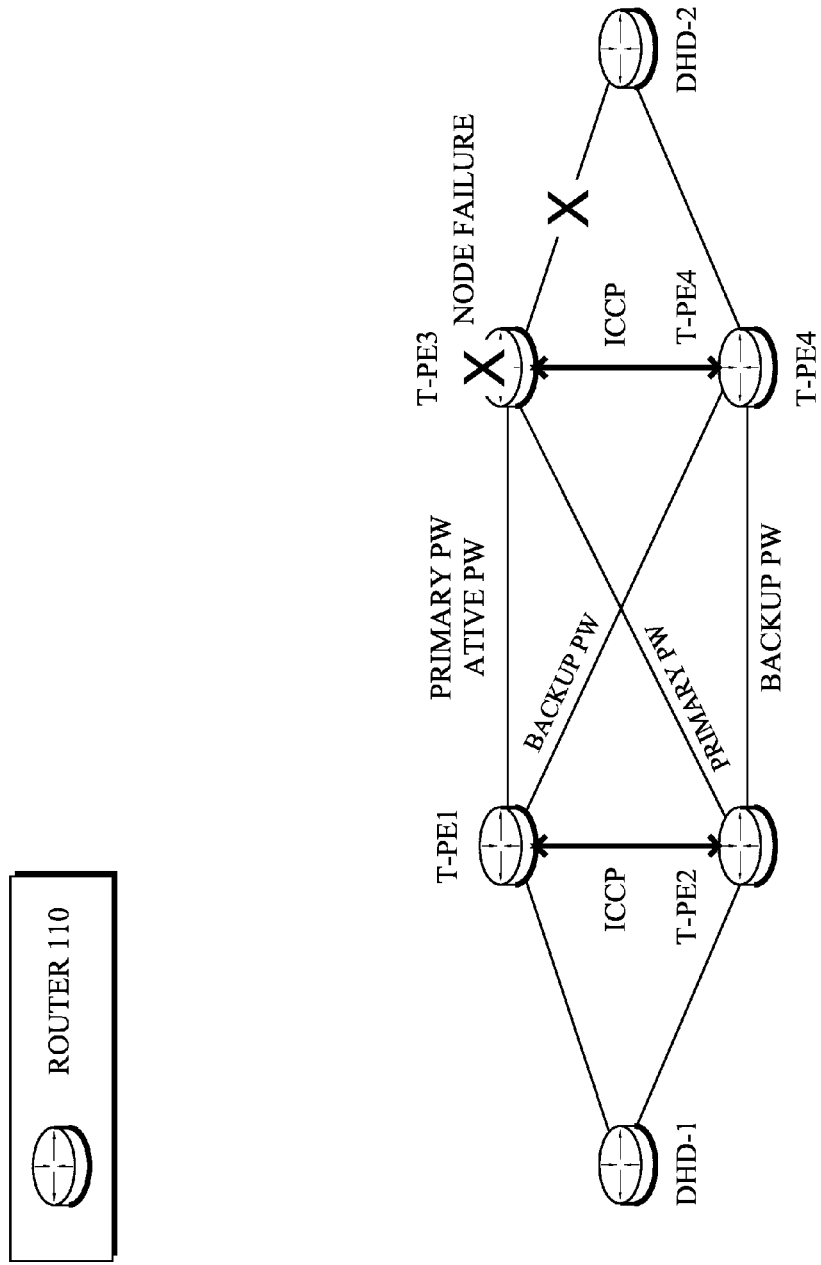
Figure 6C:
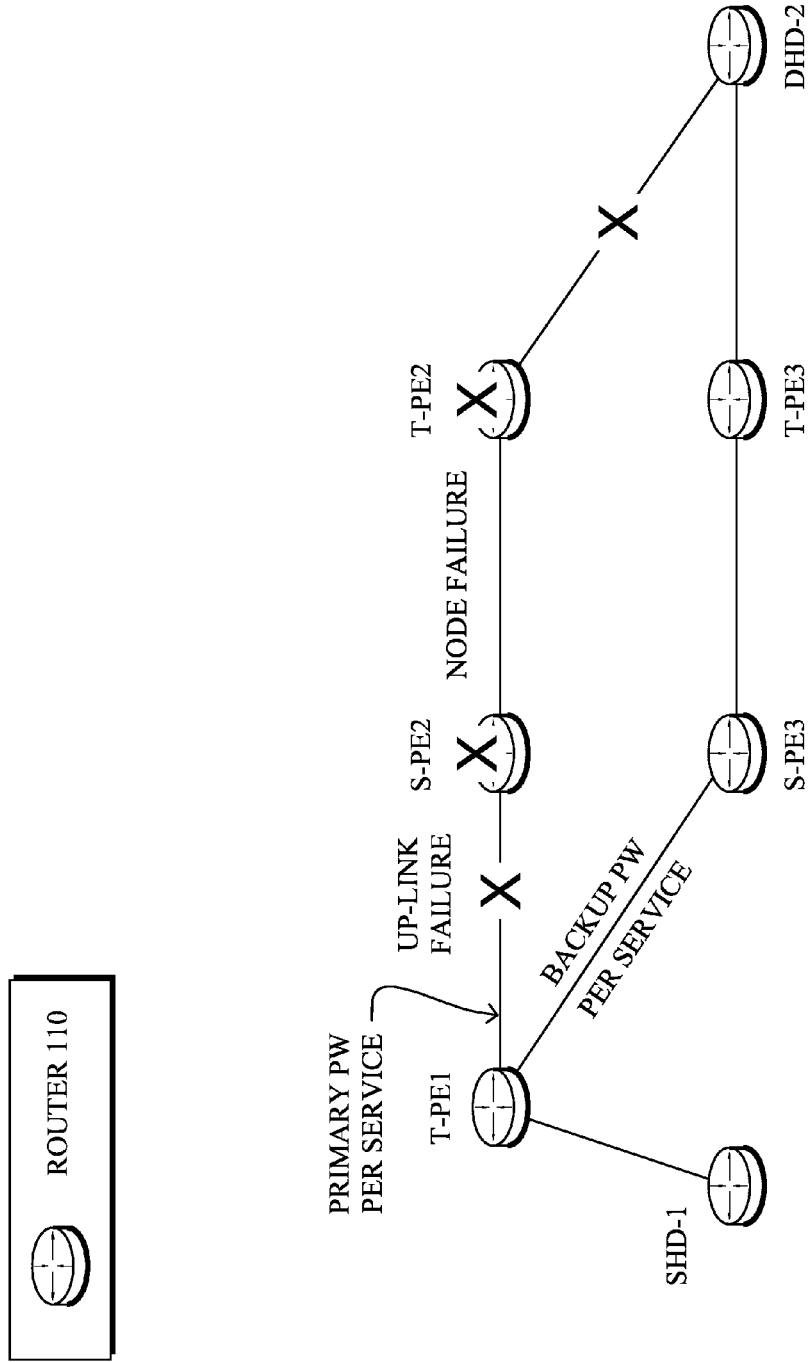

For illustration, FIGS. 6A-6C compare E-VPN P2P VPWS against pseudowire (PW) redundancy. In particular, FIG. 6A illustrates E-VPN P2P VPWS versus PW redundancy, where DHD-2 is dual homed to terminating PE T-PE2 and T-PE3 with many services that need to be cross-connected to SHD-1 connected to T-PE1. Assume that both E-VPN P2P VPWS and PW redundancy require discovering of the service endpoints, but while E-VPN does it via A-D routes, PW uses manual provisioning to provision the terminating point for the service. In general, two signaled PWs per service are needed for PW redundancy, while no pseudowire signaling is needed for E-VPN P2P VPWS. Note that PW redundancy allows for Active/Standby Redundancy only, and not the Active/Active Redundancy afforded by the techniques herein. In particular, the backup PW is not used to carry traffic, as opposed to the ability to load-balance traffic to T-PE2 and T-PE3 according to the techniques herein.

Notably, in FIG. 6A, upon up-link failure or T-PE2 node failure, T-PE1 needs to activate the backup PW in the control plane (control plane convergence) while the techniques herein allow for prefix-independent convergence (PIC) handling by simply removing T-PE2 from the ECMP (data plane convergence). Also, on Access Link failure, the techniques herein use only one control plane message, not two. That is, for PWs, T-PE2 sends a group PW Message to T-PE1, and T-PE1 sends one to activate the group of backup PWs. The techniques herein use mass-withdrawal of the Ethernet A-D route for the segment attached to T-PE2, and T-PE1 removes T-PE2 from the ECMP. (Note that there is the option of local repair between T-PE2 and T-PE3, for E-VPN, which is not currently defined for PW redundancy.)

FIG. 6B illustrates E-VPN P2P VPWS versus two-way PW-Redundancy, where DHD-1 and DHD-2 are dual-homed to T-PE1 and T-PE2 and T-PE3 and T-PE4 with many services that need to be cross-connected. Here, there are four signaled PWs per service, while again, there would be no pseudowire signaling needed according to the techniques herein. Still, only Active/Standby Redundancy is available using PWs (versus Active/Active and Active/Standby Redundancy), and the backup PW is not used to carry traffic (unlike allowing traffic ECMP to T-PE1/2 and T-PE3/4 according to the techniques herein). On Access Link failure, there are still two control plane messages (T-PE4 sends a group PW Message to T-PE1 activating the PWs, and T-PE1 sends one to the group of Backup PWs) versus one control plane message per the techniques herein (a mass withdraw of the Ethernet A-D route for the segment attached to T-PE3, and T-PE1 removing T-PE3 from the ECMP). (Note again, there is the option of local repair between T-PE3 and T-PE4, for E-VPN, which is not currently defined for PW redundancy.)

FIG. 6C illustrates another example, this time comparing E-VPN P2P VPWS to Multi-Segment (MS) PW Redundancy. Here, for example, DHD-2 is dual-homed to T-PE2 and T-PE3 with many services that need to be cross-connected to SHD-1 connected to T-PE1 via switching PEs S-PE2 and S-PE3, respectively. In this arrangement, there are two signaled MS-PWs per service, while again no pseudowire signaling is needed for E-VPN P2P VPWS. On up-link failure or T-PE2/S-PE2 node failures, S-PE3 needs to propagate and T-PE1 needs to activate the Backup PW in the control plane, versus PIC handling simply removing S-PE2 from the ECMP according to the techniques herein. Also, on Access Link failure, four control plane messages are needed for PWs (T-PE2 to send group PW Message to S-PE2, S-PE2 to send group message after converting the group-id to T-PE1, and T-PE1 to activate Group of Backup PWs to S-PE3, and S-PE3 sends a group message to T-PE3 after converting the group-id), as opposed to a single control plane message for the techniques herein (e.g., a mass withdraw of Ethernet A-D route for the segment attached to T-PE2, and T-PE1 removing S-PE2 from the ECMP).

Figure 7:
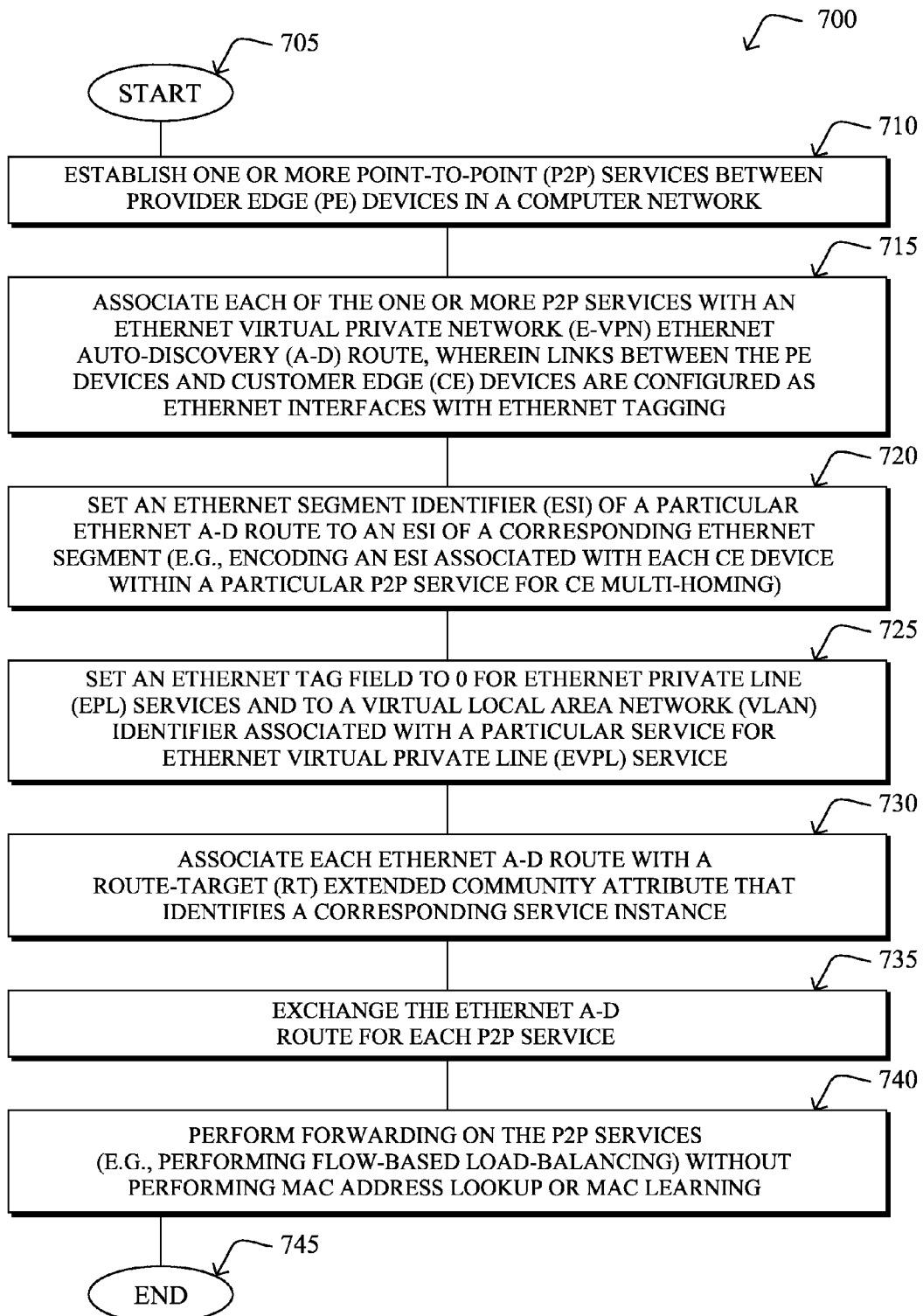
FIG. 7 illustrates an example simplified procedure for providing VPWS using E-VPN according to the techniques described herein.

FIG. 7 illustrates an example simplified procedure 700 that provides for VPWS using E-VPN in accordance with one or more embodiments described herein. The procedure 700 may start at step 705, and continues to step 710, where, as described in greater detail above, a device establishes (or participates in establishing) one or more P2P services (VPWS) between PE devices in a computer network. Each of the one or more P2P services are associated in step 715 with an E-VPN Ethernet A-D route, where links between the PE devices and CE devices are configured as Ethernet interfaces with Ethernet tagging (e.g., and in certain embodiments may be configured as trunks with a plurality of VLANs, as noted above). Notably, as mentioned above, there may be one EVI for P2P services having a plurality of sites or a plurality of EVPL services, where each EVI is associated with a separately identifying BGP Route Target (RT).

In step 720, an ESI of a particular Ethernet A-D route is set to an ESI of a corresponding Ethernet Segment (e.g., encoding an ESI associated with each CE device within a particular P2P service for CE multi-homing, as noted). Also, in step 725, an Ethernet Tag field may be set to 0 for EPL services, and to a VLAN-ID associated with a particular service for EVPL service. Further, in step 730, each Ethernet A-D route may be associated with a route-target (RT) extended community attribute that identifies a corresponding service instance.

In step 735, the appropriate devices exchange the Ethernet A-D route for each P2P service. For instance, as noted above, ASBRs re-advertise Ethernet A-D routes with their own addresses as a corresponding next-hop attribute of the re-advertised Ethernet A-D routes. Accordingly, in step 740, devices in the network 100 may transmit traffic according to the P2P services, that is, performing forwarding on the one or more P2P services without performing a MAC address lookup and without performing MAC learning, as described herein. Notably, in multi-homed embodiments, such transmission may comprise performing flow-based load-balancing between a plurality of PE devices connected to a same multi-homed CE device, where each of the plurality of PE devices connected to the same multi-homed CE device are configured with a same EVI RT.

The simplified procedure 700 illustratively ends in step 745, though signaling and traffic transmission may continue from any step detailed above. It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for VPWS using E-VPN. In particular, the techniques herein allow service endpoint discovery and VPN label exchange to be performed in an integrated fashion using a single protocol (e.g., BGP), compared to RFC4448 where LDP is needed for signaling and BGP for discovery. In addition, the techniques herein do not need pseudowires (PWs), nor per-service PW signaling or multi-segment PW (MS-PW) signaling, and do not suffer from PW scale issues. Moreover, the techniques herein provide support for redundancy with active/active multihoming and flow-based load-balancing, such as through the use of ECMP with P2P VPWS services. Still further, on link or node failure, E-VPN can trigger failover with the withdrawal of a single BGP route per service according to the techniques herein, whereas with VPWS PW redundancy, the failover sequence requires exchange of two control plane messages: one message to deactivate the group of primary PWs and a second message to activate the group of backup PWs associated with the access link. Data-plane local repair (prefix independent convergence) on node or link failures is also possible with E-VPN based VPWS, versus control plane convergence with PW redundancy.

While there have been shown and described illustrative embodiments that provide for VPWS using E-VPN, it is to be understood that various other adaptations and modifications may be made within the spirit and scope of the embodiments herein. For example, the embodiments have been shown and described herein with relation to specific protocols and terminology. However, the embodiments in their broader sense are not as limited, and may, in fact, be used with other suitably similar protocols, and may be described using functionally similar terms.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   establishing, by a device in a computer network, one or more point-to-point (P2P) services between attachment circuits on provider edge (PE) devices in the computer network;
   associating each of the one or more P2P services with an Ethernet virtual private network (E-VPN) Ethernet Auto-Discovery (A-D) route, wherein links between the PE devices and customer edge (CE) devices are configured as Ethernet interfaces with tagging;
   setting an Ethernet Tag field to 0 for Ethernet Private Line (EPL) services and to a virtual local area network (VLAN) identifier associated with a particular service for Ethernet Virtual Private Line (EVPL) service;
   exchanging the Ethernet A-D route for each P2P service attachment circuit; and
   performing forwarding on the one or more P2P services without performing a media access control (MAC) address lookup and without performing MAC learning.

2. The method as in claim 1, further comprising:
   setting an Ethernet Segment Identifier (ESI) of a particular Ethernet A-D route to an ESI of a corresponding P2P service attachment circuit.

3. The method as in claim 1, further comprising:
   associating each Ethernet A-D route with a route-target (RT) extended community attribute that identifies a corresponding service instance.

4. The method as in claim 1, wherein AS border routers (ASBRs) re-advertise Ethernet A-D routes with their own addresses as a corresponding next-hop attribute of the re-advertised Ethernet A-D routes.

5. The method as in claim 1, wherein there is one E-VPN instance (EVI) for P2P services having either a plurality of sites or a plurality of Ethernet Virtual Private Line (EVPL) services, wherein each P2P service is associated with a separately identifying Ethernet Tag.

6. The method as in claim 1, further comprising:
   encoding an Ethernet Segment Identifier (ESI) associated with each CE device within a particular Ethernet A-D route for CE multi-homing.

7. The method as in claim 6, further comprising:
   performing flow-based load-balancing between a plurality of PE devices connected to a same multi-homed CE device, wherein each of the plurality of PE devices connected to the same multi-homed CE device are configured with a same virtual private wire service (VPWS) instance.

8. The method as in claim 1, wherein the Ethernet interfaces are configured as trunks with a plurality of virtual local area networks (VLANs).

9. An apparatus, comprising:
   one or more network interfaces to communicate within a computer network;
   a processor coupled to the network interfaces and adapted to execute one or more processes; and
   a memory configured to store a process executable by the processor, the process when executed operable to:
     participate in establishing one or more point-to-point (P2P) services between attachment circuits on provider edge (PE) devices in a computer network;
     associate each of the one or more P2P services with an Ethernet virtual private network (E-VPN) Ethernet Auto-Discovery (A-D) route, wherein links between the PE devices and customer edge (CE) devices are configured as Ethernet interfaces with Ethernet tagging;
     set an Ethernet Tag field to 0 for Ethernet Private Line (EPL) services and to a virtual local area network (VLAN) identifier associated with a particular service for Ethernet Virtual Private Line (EVPL) service;
     exchange the Ethernet A-D route for each P2P service attachment circuit; and
     perform forwarding on the one or more P2P services without performing a media access control (MAC) address lookup and without performing MAC learning.

10. The apparatus as in claim 9, wherein the process when executed is further operable to:
    set an Ethernet Segment Identifier (ESI) of a particular Ethernet A-D route to an ESI of a corresponding P2P service attachment circuit.

11. The apparatus as in claim 9, wherein the process when executed is further operable to:
    associate each Ethernet A-D route with a route-target (RT) extended community attribute that identifies a corresponding E-VPN service instance.

12. The apparatus as in claim 9, wherein AS border routers (ASBRs) re-advertise Ethernet A-D routes with their own addresses as a corresponding next-hop attribute of the re-advertised Ethernet A-D routes.

13. The apparatus as in claim 9, wherein there is one E-VPN instance (EVI) for P2P services having either a plurality of sites or a plurality of Ethernet Virtual Private Line (EVPL) services, wherein each P2P service is associated with a separately identifying Ethernet Tag.

14. The apparatus as in claim 9, wherein the process when executed is further operable to:
  encode an Ethernet Segment Identifier (ESI) associated with each CE device within a particular Ethernet A-D route for CE multi-homing.

15. The apparatus as in claim 14, wherein the process when executed is further operable to:
  perform flow-based load-balancing between a plurality of PE devices connected to a same multi-homed CE device, wherein each of the plurality of PE devices connected to the same multi-homed CE device are configured with a same virtual private wire service (VPWS) instance.

16. The apparatus as in claim 9, wherein the Ethernet interfaces are configured as trunks with a plurality of virtual local area networks (VLAN s).

17. A tangible, non-transitory, computer-readable media having software encoded thereon, the software when executed by a processor operable to:
  participate in establishing one or more point-to-point (P2P) services between attachment circuits on provider edge (PE) devices in a computer network;
  associate each of the one or more P2P services with an Ethernet virtual private network (E-VPN) Ethernet Auto-Discovery (A-D) route, wherein links between the PE devices and customer edge (CE) devices are configured as Ethernet interfaces with Ethernet tagging;
  set an Ethernet Tag field to 0 for Ethernet Private Line (EPL) services and to a virtual local area network (VLAN) identifier associated with a particular service for Ethernet Virtual Private Line (EVPL) service;
  exchange the Ethernet A-D route for each P2P service attachment circuit; and
  perform forwarding on the one or more P2P services without performing a media access control (MAC) address lookup and without performing MAC learning.

\* \* \* \* \*